United States Patent Office 3,838,018
Patented Sept. 24, 1974

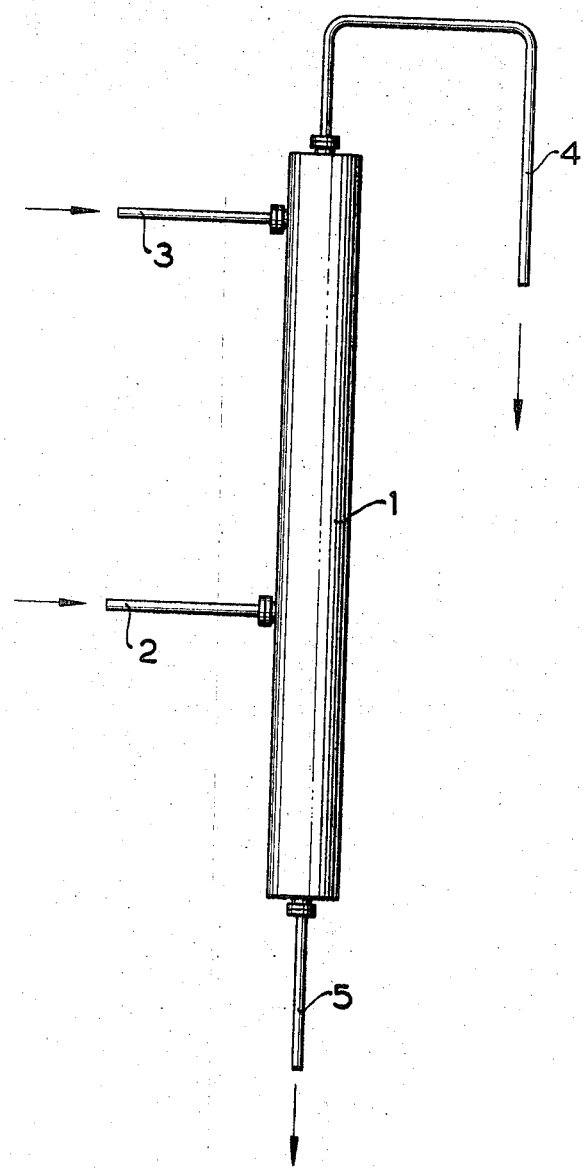

3,838,018
PROCESS FOR ISOLATING FORMALDEHYDE FROM MIXTURES OF ACETIC ACID, FORMALDEHYDE AND WATER BY DISTILLATION WITH ADDED WATER
Klaus Gehrmann, Knapsack, Heinz Erpenbach, Surth, Heinz Handte, Erftstadt-Bliesheim, and Manfred Bredtmann, Elsdorf, Germany, assignors to Knapsack Aktiengesellschaft, Knapsack, near Cologne, Germany
Filed Sept. 8, 1972, Ser. No. 287,477
Claims priority, application Germany, Sept. 11, 1971,
P 21 45 517.4
Int. Cl. B01d *3/34;* C07c *45/24, 51/44*
U.S. Cl. 203—92                                4 Claims

ABSTRACT OF THE DISCLOSURE

Formaldehyde is isolated and pure acetic acid is recovered from mixtures containing substantially between 75 and 99 weight percent of acetic acid, between 0.5 and 15 weight percent of water and between 0.5 and 10 weight percent of formaldehyde. To this end, the mixture is distilled in a distilling column at atmospheric or reduced pressure at a reflux ratio between 0.5 and 2, and water flowing countercurrently with respect thereto, is simultaneously introduced near the head of the column. The water is used in a proportion substantially between 10 and 20 weight percent, based on the crude acid put through. Following condensation, an aqueous formaldehyde solution is removed near the head of the distilling column and acetic acid with a purity of at least 99 weight percent is obtained, in the column base portion.

---

The present invention relates to a process for isolating formaldehyde from mixtures of acetic acid, formaldehyde and water, by extractive distillation with water.

Mixtures, such as those which are to be purified by the process of the present invention, are obtained, for example, as by-products in the work-up of reaction mixtures produced by the catalytic oxidation in gas phase of propylene with the resultant formation of acrylic acid. The isolation of formaldehyde from such mixtures so as to obtain acetic acid free from formaldehyde has been found profitable in view of the fact that acrylic acid, which is the primary reaction product obtained in the oxidation of propylene, contains an acetic acid fraction substantially between 5 and 15 weight percent.

The acetic acid to be freed from formaldehyde normally contains between 0.5 and 15 weight percent of water and between 0.5 and 10 weight percent of formaldehyde. In other words, the starting mixture contains acetic acid in rather high concentrations. The customary distillation of such mixture for the purpose of isolating the formaldehyde from the acetic acid results firstly in the formation of a distillate, which contains aqueous acetic acid with a strength between 30 and 70 weight percent having between 3 and 20 weight percent of formaldehyde therein, and secondly in the formation of a base-product, which is acetic acid free from water and formaldehyde, the base product being obtained in a yield between 75 and 85%. This process is not fully satisfactory, however, as it does not permit the formaldehyde and acetic acid to be completely separated from one another. In addition to this, there are the limitations in the field of environmental control, which do not permit a distillate having the above composition to be rejected as waste water.

German published Specification DOS 1,805,758 describes a process for isolating fatty acids of low molecular weight having between 2 and 4 carbon atoms in the molecule from their aqueous, formaldehyde-containing solutions by subjecting the aqueous solutions to extraction using isophorone and/or trimethylcyclohexanone as the extractant. In this process, the $C_2$–$C_4$ fatty acids are obtained in the extract, from which they can be isolated by distillation, whilst the formaldehyde is retained in the aqueous phase. The aqueous solutions contain fatty acids in a concentration substantially between 10 and 30 weight percent and it is therefore justified to try an extraction process. Using this conventional process in an attempt to provide a solution for the problem underlying the present invention would be a commercially unattractive procedure in view of the high concentration of acetic acid in the mixtures which are to be purified. To achieve this, it would be necessary firstly to use large quantities of acetic acid-extractants and secondly to use large quantities of water so as to achieve the necessary phase separation and absorb the formaldehyde.

It is accordingly an object of the present invention to provide a process which firstly enables formaldehyde to be separated substantially quantitatively from mixtures of acetic acid, formaldehyde and water so as to obtain pure acetic acid and which secondly enables the resulting aqueous distillate, that is free from acetic acid and contains formaldehyde, to be treated biologically under commercially attractive conditions.

We have now discovered that a mixture of acetic acid, formaldehyde and water with a relatively high concentration of acetic acid therein can be subjected to extractive distillation using water as the extractant so as to quantitatively isolate formaldehyde therefrom and obtain substantially pure acetic acid.

The process of the present invention for isolating formaldehyde and recovering pure acetic acid from mixtures of acetic acid, formaldehyde and water, the mixture containing substantially between 75 and 99 weight percent of acetic acid, between 0.5 and 15 weight percent of water and between 0.5 and 10 weight percent of formaldehyde, comprises more particularly distilling the mixture in a distilling column at atmospheric pressure or under reduced pressure at a reflux ratio between 0.5 and 2, simultaneously introducing water flowing countercurrently with respect thereto, near the head of the column, the water being used in a proportion substantially between 10 and 20 weight percent, based on the crude acid put through; following condensation, removing an aqueous formaldehyde solution near the head of the distilling column and recovering acetic acid with a purity of at least 99 weight percent, in the column base portion.

A preferred embodiment of the process of the present invention comprises maintaining a temperature substantially between 116 and 118° C. in the column base portion and a temperature substantially between 96 and 100° C. in the column head, at atmospheric pressure.

A further preferred feature comprises effecting the distillation at a reflux ratio substantially of 1.

The starting mixture which is to be purified normally contains between 90 and 99 weight percent of acetic acid, between 0.5 and 5 weight percent of water, and between 0.5 and 5 weight percent of formaldehyde.

The process of the present invention has unexpectedly been found to produce a purifying effect as the use of water as an extractant for achieving the separation of water soluble-compounds, such as acetic acid and formaldehyde, from one another, in combination with a distilling process would not have been expected to produce such separating effect.

The process of the present invention also is a desirable step forward in the art as it enables a by-product, which is obtained in the oxidation of propylene to acrylic acid and which has long been held useless, to be worked-up.

The following Examples further illustrate the process of the present invention which is described therein with reference to the accompanying drawing.

EXAMPLE 1

150 grams/hr. of acetic acid containing water and formaldehyde and composed of:

- 82 weight percent of acetic acid,
- 15 weight percent of water,
- 3 weight percent of formaldehyde were introduced through conduit 2 and at a level of 1 meter into packed distilling column 1, which was 2.5 meters high. 20 milliliters per hour of water were introduced into column 1, below the column's head, through conduit 3. The mixture was distilled at atmospheric pressure, at a temperature between 116 and 118° C. in the column base, at a temperature between 96 and 100° C. in the column head, and at a reflux ratio of 1.

46 grams/hr. of an aqueous formaldehyde solution were obtained as head product, which was removed through conduit 4, and 123 grams/hr. of acetic acid were obtained as base-product, which was removed through conduit 5.

The head product and base product were analyzed and found to have the following compositions:

Head product:
- <0.1 weight percent of acetic acid,
- 9.7 weight percent of formaldehyde or 100% of the formaldehyde used,
- the balance being water.

Base product:
- <0.1 weight percent of formaldehyde,
- 0.8 weight percent of water,
- the balance being acetic acid (=99% of the acetic acid used).

EXAMPLE 2 (Comparative Example)

The procedure was the same as that described in Example 1, save that no water was added, through conduit 3. 44 grams/hr. of head product and 106 grams/hr. of base product were obtained. They were analyzed and found to have the following composition:

Head product:
- 41 weight percent of acetic acid or 14.6% of the acetic acid used,
- 9.8 weight percent of formaldehyde or 95% of the formaldehyde used,
- the balance being water.

Base product:
- 0.2 weight percent of formaldehyde,
- 0.8 weight percent of water,
- 99 weight percent of acetic acid or 85% of the acetic acid used.

EXAMPLE 3

The procedure was the same as that described in Example 1, save that 150 grams/hr. of crude acetic acid composed of:

- 92 weight percent of acetic acid,
- 6 weight percent of water,
- 2 weight percent of formaldehyde were distilled. Water was added at an increased rate of 30 milliliter/hr., through conduit 3. 40 grams/hr. of head product and 139 grams/hr. of base product were obtained.

Composition of head product:
- 7.5 weight percent of formaldehyde (=100% of the formaldehyde used),
- <0.1 weight percent of acetic acid,
- the balance being water.

Composition of base product:
- 0.8 weight percent of water,
- <0.1 weight percent of formaldehyde,
- the balance being acetic acid (=99% of the acetic acid used).

EXAMPLE 4 (Comparative Example)

The procedure was the same as that described in Example 3, save that no water was added, through conduit 3. 36 grams/hr. of head product and 114 grams/hr. of base product were obtained.

Composition of head product:
- 8 weight percent of formaldehyde or 97% of the formaldehyde used,
- 67 weight percent of acetic acid or 17.5% of the acetic acid used,
- the balance being water.

Composition of base product:
- 0.1 weight percent of formaldehyde or 3% of the formaldehyde used,
- 0.8 weight percent of water,
- the balance being acetic acid (=82% of the acetic acid used).

What is claimed is:

1. A process for isolating formaldehyde and recovering pure acetic acid from mixtures of acetic acid, formaldehyde and water, the mixtures containing substantially between 75 and 99 weight percent of acetic acid, between 0.5 and 15 weight percent of water and between 0.5 and 10 weight percent of formaldehyde, which comprises distilling the mixture in a distilling column at atmospheric or reduced pressure at a reflux ratio between 0.5 and 2, simultaneously introducing water flowing countercurrently with respect thereto, near the head of the column, the water being used in a proportion substantially between 10 and 20 weight percent, based on the crude acid put through; following condensation, removing an aqueous formaldehyde solution near the head of the distilling column and recovering acetic acid with a purity of at least 99 weight percent, in the column base portion.

2. The process as claimed in claim 1, wherein the column base is maintained at a temperature substantially between 116 and 118° C. and the column head is maintained at a temperature substantially between 96 and 100° C., at atmospheric pressure.

3. The process as claimed in claim 1, wherein the reflux ratio substantially is 1.

4. The process as claimed in claim 1, wherein the starting mixture contains between 90 and 99 weight percent of acetic acid, between 0.5 and 5 weight percent of water and between 0.5 and 5 weight percent of formaldehyde.

References Cited

UNITED STATES PATENTS

| Number | Date | Name | Class |
|---|---|---|---|
| 3,214,347 | 10/1965 | Grekel | 203—96 |
| 2,249,380 | 7/1941 | Gerg | 260—541 |
| 2,701,233 | 2/1955 | Quinn | 203—16 |
| 2,384,374 | 9/1945 | Harrison | 260—541 |
| 3,392,091 | 7/1968 | Hohenschutz | 260—541 |

WILBUR L. BASCOMB, JR., Primary Examiner

U.S. Cl. X.R.

203—16, 96; 260—541, 606